May 14, 1968
W. A. TURUNEN
3,382,915
ROTARY REGENERATOR
Filed May 17, 1965
4 Sheets-Sheet 1
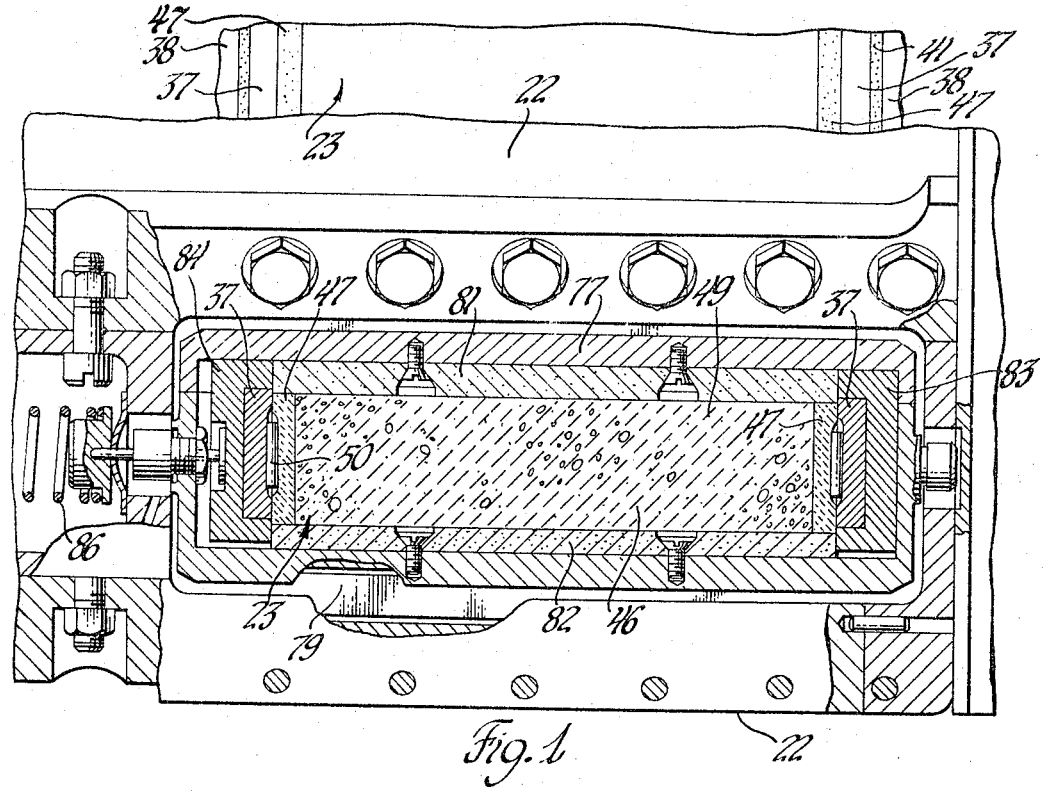
Fig. 1
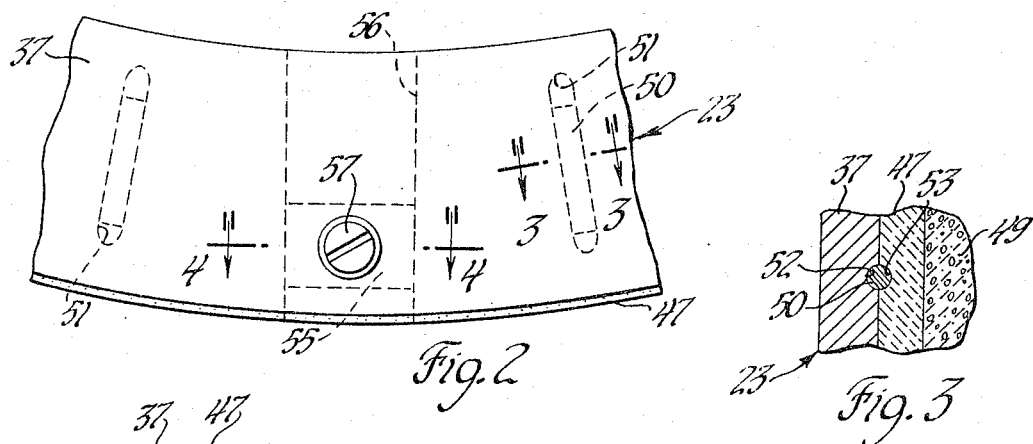
Fig. 2
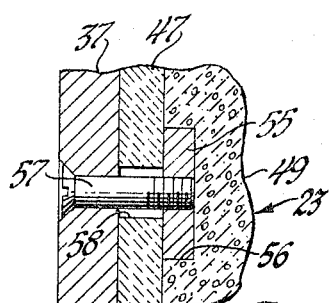
Fig. 4
Fig. 3
INVENTOR.
William A. Turunen
BY
Paul Fitzpatrick
ATTORNEY

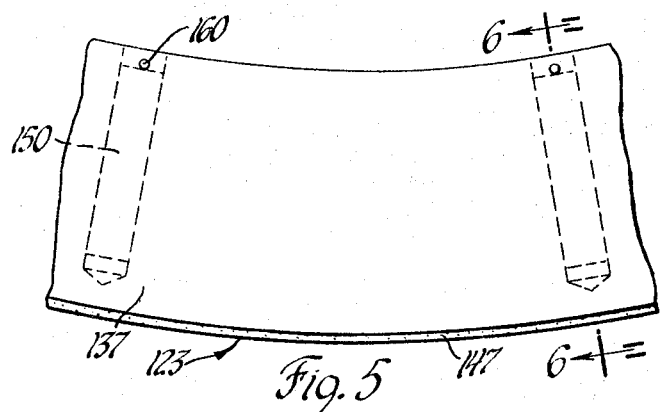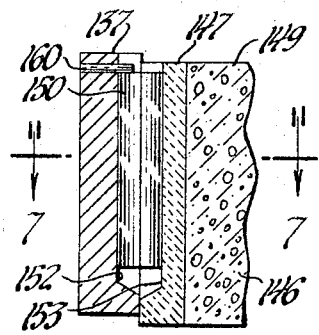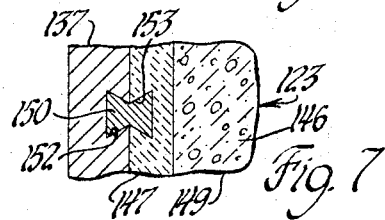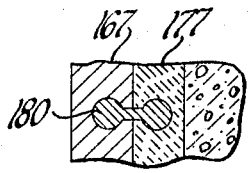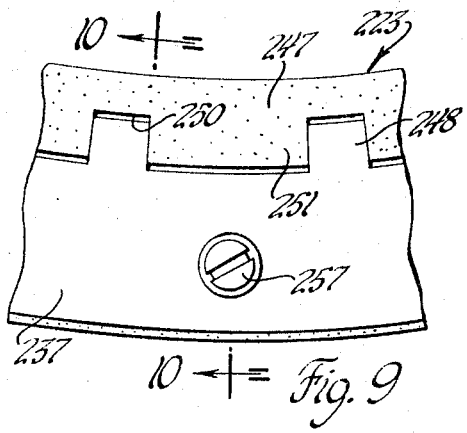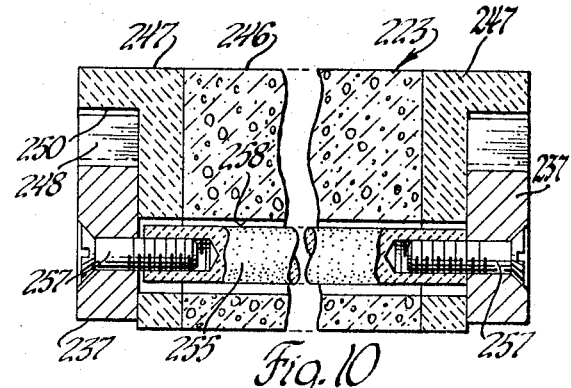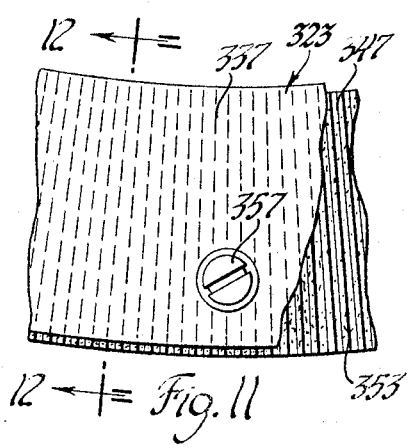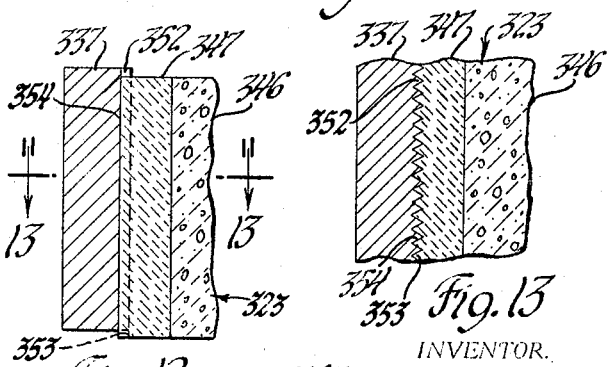

INVENTOR.
William A. Turunen
BY
Paul Fitzpatrick
ATTORNEY

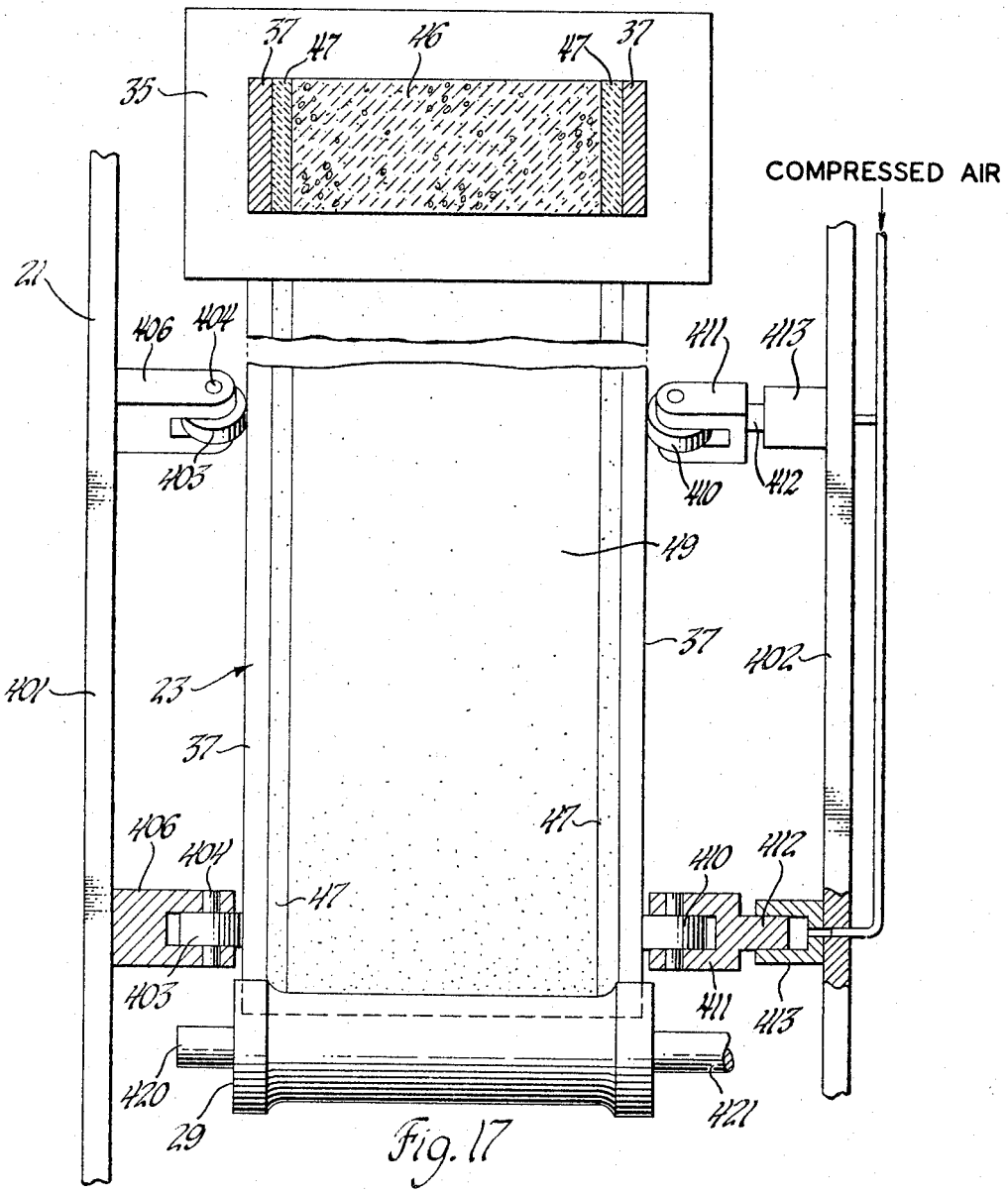

United States Patent Office 3,382,915
Patented May 14, 1968

3,382,915
ROTARY REGENERATOR
William A. Turunen, Birmingham, Mich., assignor to General Motors Corporation, Detroit, Mich., a corporation of Delaware
Filed May 17, 1965, Ser. No. 456,274
31 Claims. (Cl. 165—9)

ABSTRACT OF THE DISCLOSURE

A rotary regenerator matrix has a ceramic main body and metal end rings or rims, the latter providing the drive for and support of the ceramic body. The rims are connected to the body by splines so that relative radial expansion is provided for. The rims may be held to the matrix by internal bolts or by structure external to the matrix such as springs which bias by-pass seals or by biased rollers engaging the rims.

---

My invention relates to rotary regenerators and is particularly concerned with improvements in the matrices of such regenerators. While the invention may be applicable to regenerators of other types, it is specially beneficial in regenerators of the radial flow or annular drum type. The principal purpose of my invention is to exploit the advantages of ceramic matrices while overcoming the disadvantages.

Rotary regenerators and matrices therefor of the radial flow or drum type are known and are described, for example, in United States Patents No. 2,888,248, which is directed primarily to a main seal for a regenerator, No. 2,937,010 on a matrix structure, No. 3,057,604 which illustrates a complete regenerator as part of a gas turbine engine, and No. 3,077,074 also showing a regenerator in a gas turbine, and United States patent application Ser. No. 361,444, filed Apr. 21, 1964, now Patent No. 3,267,674, of common ownership with this application, which discloses a different installation of a regenerator in a gas turbine engine.

Such a regenerator may be considered as comprising principally a housing, a bulkhead dividing the housing into two spaces, and a matrix drum rotatable in the housing and passing through the bulkhead so as to move through the two spaces. A gas to be heated flows radially through the matrix in one space and a gas which surrenders heat flows radially through the matrix in the other space. The regenerator includes means for locating, supporting, and rotating the matrix, main or bulkhead seals to limit leakage circumferentially of the matrix from one space to the other at the bulkhead, and rim seals which extend around the circumference of the matrix to obstruct leakage past the ends of the matrix bypassing the matrix.

Matrices have commonly been made of heat resistant metal. Such matrices require considerable labor to assemble the many parts and present difficulties in sealing because of the distortion of the matrix resulting from a temperature gradient from the cooler surface to the hotter surface of the matrix. Integral matrices of ceramic material have become available which do not require the assembly process and which have relatively small distortion because of their very low coefficient of thermal expansion. However, these ceramic materials do not withstand well the heavy concentrated loads put on the drum by the supporting and rotating structure. In the type of matrix referred to, there are substantial gas loads biasing the matrix against rollers which support and drive it. The concentrated loads result in chipping of the ceramic matrix.

In accordance with my invention, the advantages of the ceramic are retained but the disadvantage referred to is obviated by providing metal rims which cooperate with the supporting and driving rollers, taking the high localized load and distributing it over relatively large areas of the ceramic. To achieve this, it is necessary that the substantial differential expansion between the metal and ceramic be accommodated. In a matrix 30 inches in diameter, a metal rim will expand approximately one-eighth of an inch more than the ceramic body when the matrix is heated from room temperature to an operating temperature of about 1000° F. In short, therefore, my invention is embodied in a regenerator or matrix with provisions for associating metal load carrying rims or the equivalent with a ceramic matrix body, accommodating differential expansion, and distributing the stresses between the rim and body.

The nature of the invention and the advantages thereof will be apparent to those skilled in the art from the succeeding detailed description of preferred embodiments of the invention and the accompanying drawings thereof.

FIGURE 1 is a partial sectional view of a rotary regenerator illustrating the matrix and main seal, taken in a plane containing the axis of the matrix.

FIGURE 2 is a partial end view of the matrix.

FIGURE 3 is a fragmentary sectional view taken on the plane indicated by the line 3—3 in FIGURE 2.

FIGURE 4 is a fragmentary sectional view taken on the plane indicated by the line 4—4 in FIGURE 2.

FIGURE 5 is a partial end view of a second form of matrix.

FIGURE 6 is a fragmentary sectional view taken on the plane indicated by the line 6—6 in FIGURE 5.

FIGURE 7 is a fragmentary sectional view taken on the plane indicated by the line 7—7 in FIGURE 6.

FIGURE 8 is a sectional view similar to FIGURE 7 of a further modification.

FIGURE 9 is a partial end view of an additional form of matrix.

FIGURE 10 is a sectional view of the same taken on the plane indicated by the line 10—10 in FIGURE 9.

FIGURE 11 is an end view, with parts cut away, of still another form of matrix.

FIGURE 12 is a fragmentary sectional view thereof taken on the plane indicated by the line 12—12 in FIGURE 11.

FIGURE 13 is a fragmentary sectional view taken on the plane indicated by the line 13—13 in FIGURE 12.

FIGURE 17 is a somewhat schematic illustration of a further embodiment of the invention, the view being taken parallel to the axis of the matrix with parts cut away and in section.

Figure 14:
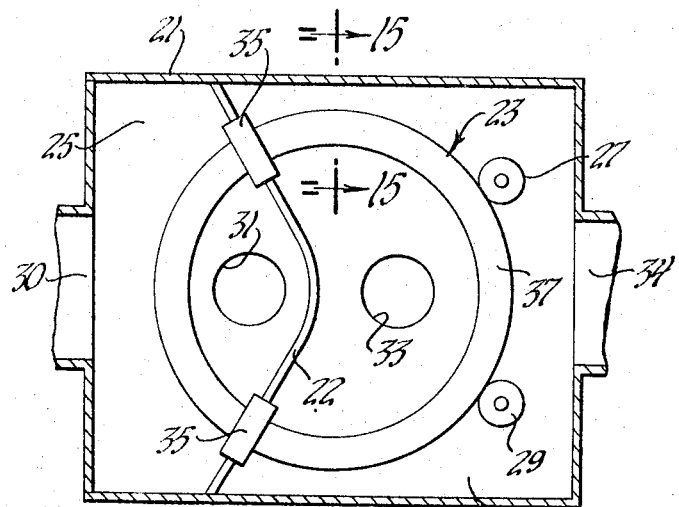
FIGURE 14 is a schematic drawing illustrating the principal elements of structure of a rotary regenerator.

The structure of regenerators of the type of which this invention is an improvement is well known. However, it may be desirable to explain a typical structure briefly with reference to FIGURE 14 in which is shown schematically a rotary regenerator including a housing 21 divided into two spaces by a bulkhead 22. A matrix 23 in the form of an annular drum is mounted to rotate about its axis through the space 25 ahead of the bulkhead and the space 26 behind the bulkhead. The matrix is supported, located, and driven by two rollers 27 and 29. In a typical installation, compressed air enters the housnig through an inlet 30, flows radially through the matrix, and is heated. The heated air then may flow through combustion apparatus where it is further heated and a turbine where it is expanded, and into the space 26, within the matrix 23. The combustion apparatus and turbine are not illustrated, and such regenerators are not necessarily used with turbines. The flow circuit is indicated on FIGURE 14 as including an outlet 31 from space 25 and an inlet 33 to space 26. The hot gas flows radially outward through the matrix and is discharged from the housing through an outlet 34. The turbine exhaust gases heat the matrix and the compressed air cools it as it is slowly rotated about its axis. Main or bulkhead seals 35 are provided to minimize leakage from the high pressure space 25 to the low pressure space 26. Rim seals engaging the end rings or rims 37 of the matrix (not illustrated in FIGURE 14) are also provided to insure that the air or gas does not escape past the side of the matrix instead of flowing through it.

Figure 15:
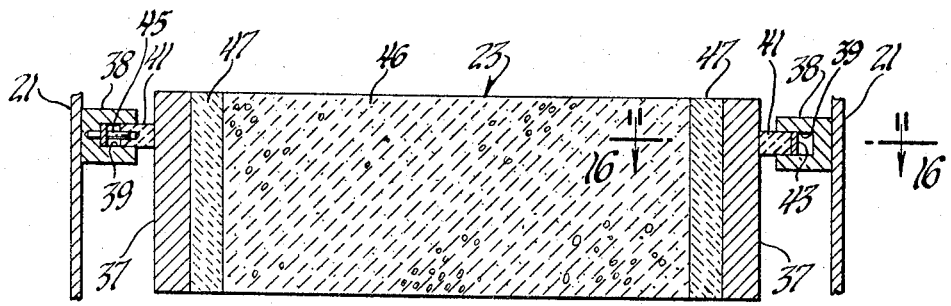
FIGURE 15 is a sectional view thereof taken on the plane indicated by the line 15—15 in FIGURE 14, illustrating the rim seals.
Figure 16:
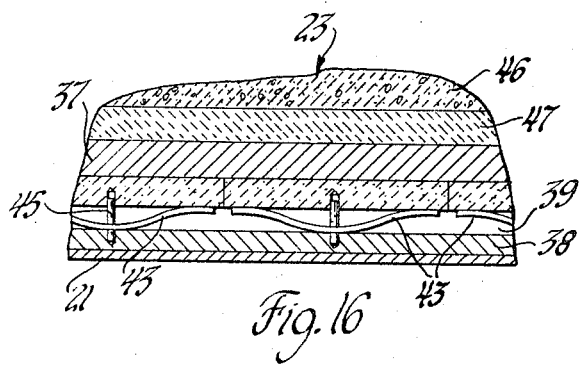
FIGURE 16 is a detail sectional view of the same taken on the plane indicated by the line 16—16 in FIGURE 15.

Such rim seals are illustrated in FIGURES 15 and 16. As shown in these figures, the walls 21 of the housing bear arcuate channel-section seal retainers 38 concentric with the axis of the matrix. Within the grooves 39 of the retainers are mounted sealing strips 41 of a graphite composition or other suitable material. These seal segments engage the rims or end rings 37 of the matrix 23. They are biased against the rings 37 by leaf springs 43 and are held against movement circumferentially of the channel by pins 45. Installations of rim seals are shown and described in greater detail in the abovementioned United States Patent Nos. 3,057,604 and 3,077,074.

Considering now the form of matrix illustrated in FIGURES 1 to 4, it may be pointed out that FIGURE 1 shows not only a cross section of the matrix but also an installation of a main seal, this installation being based upon that of Patent No. 3,057,604. Considering first the matrix 23, it comprises a drum-shaped ceramic body 46 and end rings or rims 37, generally as previously described. The body 46 is of a suitable ceramic material, one such being manufactured by the Corning Glass Works under the name "Cercor." The body 46 is a ring of rectangular cross section preferably having roughly the proportions illustrated. Ordinarily, the outer or end portions 47 of the ceramic drum are non-porous, thus providing a part of the body which is of greater strength than the major portion which we might term the pervious or porous central portion 49. The end rings 37 are of approximately the same interior and exterior diameter as the body 46, preferably being designed to have substantially the same diameters at the normal operating temperature. Thus, the end rings will be somewhat smaller when cold, as illustrated. The end rings 37 roll against the driving, supporting, and locating rollers 27 and 29 illustrated in FIGURE 14.

In the matrix of FIGURES 1 to 4, the rims are coupled to the body by pins or keys mounted in radial grooves in the adjacent end faces of the body and ring and by bolts which hold the rings on the body. The pins 50, which may be of circular cross section, are disposed in cavities 51 defined by radial notches 52 in the rings and 53 in the face of the body. With the ring held against the body, the keys transmit torque or radial loads of any sort while allowing for relative radial expansion of the parts. The means for retaining the rings shown in FIGURES 2 and 4 include a rectangular nut 55 slidably disposed in an opening or pocket 56 in the body 49 which is behind the end portion 47 to take advantage of the greater strength of this imperforate part of the matrix. A flat head bolt 57 mounted in the ring 37 is threaded into the nut 55 and passes with clearance through a hole 58 in the end portion 47. This connection allows the ring to expand or contract with respect to the body.

Referring to FIGURE 1, the main or bulkhead seal may also be described briefly, it being understood that many details of structure immaterial to understanding the present invention will not be mentioned. Such details are described in Patent No. 3,057,604. The main seal is modified from that of the patent to accommodate the relative radial expansion of the end rings and body of the matrix. The seal comprises a rectangular frame which is mounted in the bulkhead 22 so that it can shift with the matrix. A secondary seal 79 which is a rectangle of shim stock extends into saw-cuts in the frame 77 and the bulkhead so as to block off flow around the seal frame 77. Shoes 81 and 82 of a graphite composition are mounted within the frame so as to be substantially in rubbing contact with the inner and outer faces of the ceramic body. An end block 83 which is mounted so that it can slide radially of the matrix within the frame but is restrained against movement with the matrix cooperates with the outer face and the inner and outer peripheries of one end ring 37. A second seal block or end block 84 similarly cooperates with the other end ring and is biased against it by a compression spring 86. Since the end blocks 83 and 84 can move radially they do so when the ring 37 expands relative to the matrix. The major part of the main seal moves radially in and out with the body.

FIGURES 5, 6, and 7 illustrate another arrangement for mounting the end rings on the matrix body and FIGURE 8 illustrates a variant of the same. In these forms, the end rings are retained on the body by radial keys or splines which couple them for transfer of load, this result arising from the use of mortise an tenon or dovetail keys and grooves in which they are mounted. The matrix 123 of FIGURE 5 may be considered the same as matrix 23 previously described except as will be pointed out. The rim 137 and the solid portion 147 of the matrix are provided with radial undercut or dovetail grooves 152 and 153, respectively, which receive a double dovetail key or spline 150, a number of such keys being distributed around the circumference of the matrix. The keys 150 may be simply slipped into place and then be retained by frictionally held pins 160 inserted in the rim 137. The structure of FIGURE 8 is essentially the same but the key 180 is of a generally dumbbell cross section and the ring 167 and end portion 177 of the matrix are correspondingly modified to receive the different shaped key.

FIGURES 9 and 10 show a still further structure of the matrix body and end rings and also a modification in the means for retaining the end rings. In this case, the driving and supporting connection providing for radial expansion of the parts is accomplished by axial splines rather than radial splines as in the forms of the invention shown in FIGURES 2 to 8 and 11 to 13. In FIGURES 9 and 10, the matrix 223 is generally similar to those previously described and the differences will be pointed out. The end ring 237 extends only over the radially outer portion of the end of the body 246, covering somewhat over half of the end of the body as illustrated. The ring 237 includes projections 248 which extend radially inward from the ring to define axial splines. These splines are received in slots 250 in the end ring 247 with freedom for radial movement. The splines 248 cooperate with splines 251 defined by the body between the slots 250 to drive the matrix and to accept load from it.

As illustrated in FIGURES 9 and 10, the end rings 237 are retained by bolt means comprising ceramic tension rods 255 which should be of the same material as the matrix body or material having substantially the same coefficient of expansion. These tie rods, together with flat head screws 257 threaded into each end of the rods, constitute the bolt means to retain the end rings. The tie rods 255 are mounted in bores 258 in the matrix which allow them to shift radially with expansion of the end rings.

This structure has some advantages of simplicity over the means of retention shown in FIGURES 2 and 4 but may have somewhat more tendency to obstruct gas flow radially of the matrix. The tie rods 255 are of material having a low coefficient of expansion because of low thermal expansion of the body 246.

FIGURES 11, 12, and 13 show still another matrix structure similar in principle to those previously described, In this form of the matrix, the connection between the body and end ring is effected by radial serrations on these parts which act as splines, aligning the parts, carrying transverse loads, and allowing relative expansion. As shown, the matrix 323 includes the body 346 having end portion 347 abutting end rings 337. The inner face of the ring is formed with serrations 352 and the outer face or end of the body is formed with mating serrations 353. Thus a serrated or spline joint 354 is provided. Because of the convergence of the serrations, a small amount of play in the serrations is required to allow the relative expansion. The means for retaining the rings in this case include bolts 357 which may cooperate with the sort of structure illustrated in FIGURE 4 or with the ceramic tie rod illustrated in FIGURE 10.

The forms of the invention so far described have one feature in common, that the matrix including the end rings is a self-contained structure positively assembled together. The invention may be embodied with some advantages in a structure in which the end rings are separate from the body of the matrix except as they are kept together by other parts of the regenerator when the machine is assembled.

One embodiment having this characteristic is illustrated in FIGURE 17. In FIGURE 17, the matrix identified as 23 may be any of the structures so far described but the illustration corresponds most closely to the matrices of FIGURES 2 to 8 in which the matrix body is 46 and end rings are 37. The main seal 35 is shown schematically and the bulkhead is not illustrated. In this form of the invention, the end rings are retained on the body of the matrix by structure of the regenerator which holds them together when the machine is assembled. As illustrated, the regenerator includes walls 401 and 402 which may be parts of the housing 21. The left-hand ring 37 as disclosed rides upon three rollers 403 disposed approximately 120° apart, only two of which are shown. The rollers are mounted on shafts 404 supported in pedestals 406 mounted on the wall 401. The right-hand end ring 37 is engaged by rollers 410 mounted in brackets 411 which may move to a limited extent toward and away from the matrix and are biased toward the matrix by any suitable means. As illustrated, the brackets 411 have stems 412 which are disposed as plungers or pistons in cylinders 413 fixed to wall 402. These cylinders are supplied with air under sufficient pressure from any suitable source to hold the parts of the matrix together. FIGURE 17 also illustrates a driving or supporting roller which we may consider to be a driving roller and which is identified as 29, the roller having a stub shaft 420 and a driving shaft 421 driven by any suitable power source. The end portions of roller 29 cooperate with the periphery of the rims 37, the roller being spaced from the ceramic heat transfer material 49 and from the marginal portions 47 of the matrix.

Rim seals such as are illustrated in FIGURES 15 and 16 are not shown on FIGURE 17. The reason for this is to avoid confusion and complexity of the figure. Such seals would normally be present.

This leads to still another embodiment of the invention which should be considered. Referring to FIGURES 15 and 16, the springs 43 by which the rim seal segments 41 are biased against the rims of the matrix may exert sufficient force to hold the parts of the matrix assembled, thus eliminating any internal attachment of the parts of the matrix and any specially provided external devices for holding the matrix assembled. In this form, it is a matter to be considered whether the friction incident upon the force holding the matrix together is desirable. This will depend upon various factors.

It should be pointed out that several forms of interconnection between the body of the matrix and the end rings have been illustrated: The keys of FIGURES 2 to 4, the dovetail keys of FIGURES 5 to 7 and FIGURE 8, the axial splines of FIGURES 9 and 10, and the integral radial splines of FIGURES 11 and 12. Also, a variety of ways of holding the rim in association with the body of the matrix have been disclosed. Specifically, the short bolts of FIGURES 2 and 4, the dovetail keys of FIGURES 5 to 7 and 8, the ceramic tie rod bolt of FIGURE 10, the rollers urged against the matrix of FIGURE 17, and the resiliently biased rim seals of FIGURES 15 and 16. It will be apparent that any of these means for holding the parts together in operation can be employed with any of the matrix structures illustrated. However, it is obviously unnecesary to illustrate all of these possible combinations.

It may be pointed out that the rims 37 may, if desired, include teeth for cooperation with driving gears such as are shown in the prior art patents referred to or the rim may be plain for cooperation with friction drive rollers. It should also be pointed out that the end portions of the ceramic are not necessarily of a different character from the central heat transfer portion but that it seems desirable to retain a strong dense structure against the metal rim rather than the rim directly engage the weaker porous structure.

It will be apparent to those skilled in the art that all of the forms of the invention disclosed are well adapted to transfer to the metal parts the gas loads, matrix weight, inertia loads, and any other loads on the ceramic structure; distribute the load so as to provide a light unit loading on the ceramic, and then to transfer the load from the metal to the concentrated points of support. These embodiments accomplish this end wtihout stress from differential expansion and with simple and rugged structures.

The description of preferred embodiments of the invention to illustrate the principles thereof is not to be considered as limiting the invention, since many modifications within the scope of the invention may be made by the exercise of skill in the art.

I claim:
1. A rotary regenerator comprising, in combination,
   a housing, a bulkhead dividing the housing into two spaces, an annular drum matrix disposed partially in each space, means supporting the matrix and rotating it about its axis, main seals obstructing leakage circumferentially of the matrix past the matrix at the bulkhead, and rim seals engaging the ends of the matrix obstructing leakage radially of the matrix,
   the matrix comprising a drum-shaped body of a first material having end portions and having a porous central portion integral with the end portions,
   end rings abutting the end portions of the body, the rings being composed of a material resistant to mechanical wear and having a different coefficient of thermal expansion from the body,
   the rings engaging the said supporting and rotating means and the rim seals,
   means providing a circumferentially rigid and radially free connection between the body and each ring,
   and means retaining the rings in engagement with the body.

2. A rotary generator as defined in claim 1 in which splines provide the said connection between the body and each ring.

3. A rotary regenerator as defined in claim 2 in which the splines are radial.

4. A rotary regenerator as defined in claim 3 in which the splines are integral with the body and rings.

5. A rotary regenerator as defined in claim 3 in which the splines are defined by radial keys lodged in radial grooves in the body and rings.

6. A rotary regenerator as defined in claim 5 in which the splines and grooves embody a dovetail connection retaining the rings on the body.

7. A rotary regenerator as defined in claim 2 in which the splines are axial.

8. A rotary regenerator as defined in claim 1 in which the means retaining the rings in engagement with the body is within the matrix.

9. A rotary regenerator as defined in claim 8 in which the retaining means includes pins having a dovetail connection with the body and the rings.

10. A rotary regenerator as defined in claim 8 in which the retaining means includes bolts extending from the rings into the body.

11. A rotary regenerator as defined in claim 10 in which the bolts include portions lodging against the end portions of the body.

12. A rotary regenerator as defined in claim 10 in which the bolts extend from end to end of the matrix and include ceramic tie rods within the body.

13. A rotary regenerator as defined in claim 1 in which the means retaining the rings in engagement with the body is a part of the regenerator external to the matrix.

14. A rotary regenerator as defined in claim 13 in which the retaining means is means biased axially of the matrix engaging the rims.

15. A rotary regenerator as defined in claim 13 in which the retaining means is means biasing the rim seals against the rims axially of the matrix.

16. A rotary regenerator as defined in claim 13 in which the retaining means includes rollers engaging opposite ends of the matrix and means biasing the rollers together.

17. A rotary regenerator comprising, in combination, a housing, a bulkhead dividing the housing into two spaces, an annular drum matrix disposed partially in each space, means supporting the matrix and rotating it about its axis, main seals obstructing leakage circumferentially of the matrix past the matrix at the bulkhead, and rim seals engaging the ends of the matrix obstructing leakage radially of the matrix, the matrix comprising a drum-shaped body of a first material having end portions and having a porous central portion integral with the end portions, end rings abutting the end portions of the body, the rings being composed of a material resistant to mechanical wear and having a different coefficient of thermal expansion from the body, the rings engaging the said supporting and rotating means and the rim seals, and means providing a circumferentially rigid and radially free connection between the body and each ring, the rim seals engaging the rings and retaining the rings in engagement with the body.

18. A rotary regenerator comprising, in combination, a housing, a bulkhead dividing the housing into two spaces, an annular drum matrix disposed partially in each space, means supporting the matrix and rotating it about its axis, the matrix comprising a drum-shaped body of a first material having end portions and having a porous central portion integral with the end portions, end rings abutting the end portions of the body, the rings being composed of a material resistant to mechanical wear and having a different coefficient of thermal expansion from the body, the rings engaging the said supporting and rotating means and the rim seals, means providing a circumferentially rigid and radially free connection between the body and each ring, and means retaining the rings in engagement with the body.

19. A rotary regenerator comprising, in combination, a housing, a bulkhead dividing the housing into two spaces, an annular drum matrix disposed partially in each space, means supporting the matrix and rotating it about its axis, the matrix comprising a drum-shaped body of a first material having end portions and having a porous central portion integral with the end portions, end rings abutting the end portions of the body, the rings being composed of a material resistant to mechanical wear and having a different coefficient of thermal expansion from the body, the rings engaging the said supporting and rotating means and means providing a circumferentially rigid and radially free connection between the body and each ring and retaining the rings in engagement with the body.

20. A rotary regenerator matrix comprising, in combination, an annular ceramic drum having a relatively low coefficient of thermal expansion, the drum including end portions and a porous central portion, end rings of metal having a higher coefficient of thermal expansion than the drum engaging the end portions of the drum, means retaining the rings in contact with the drum, and means providing a torque-transmitting connection between the drum and each ring with freedom for relative radial expansion.

21. A matrix as defined in claim 20 in which splines provide the said connection between the drum and each ring.

22. A matrix as defined in claim 21 in which the splines are radial.

23. A matrix as defined in claim 22 in which the splines are integral with the drum and rings.

24. A matrix as defined in claim 22 in which the splines are defined by radial keys lodged in radial grooves in the drum and rings.

25. A matrix as defined in claim 24 in which the splines and grooves embody a dovetail connection retaining the rings on the body.

26. A matrix as defined in claim 21 in which the splines are axial.

27. A matrix as defined in claim 20 in which the means retaining the rings in contact with the drum includes pins having a dovetail connection with the drum and the rings.

28. A matrix as defined in claim 20 in which the means retaining the rings in contact with the drum includes bolts extending from the ring into the drum.

29. A matrix as defined in claim 28 in which the bolts include portions lodging against the end portions of the drum.

30. A matrix as defined in claim 28 in which bolts extend from end to end of the matrix and include ceramic tie rods within the drum.

31. A rotary regenerator matrix comprising, in combination, an annular ceramic drum having a relatively low coefficient of thermal expansion, the drum including end portions and a porous central portion, end rings of metal having a higher coefficient of thermal expansion than the drum engaging the end portions of the drum, and means retaining the rings in contact with the drum and providing a spline connection between the drum and each ring with freedom for relative radial expansion.

References Cited

UNITED STATES PATENTS

| | | | |
|---|---|---|---|
| 2,419,906 | 4/1947 | Mills | 285—136 |
| 2,888,248 | 5/1959 | Bubniak et al. | 165—9 |
| 2,937,010 | 5/1960 | Collman et al. | 165—10 |
| 3,057,604 | 10/1962 | Bubniak et al. | 165—9 |
| 3,180,402 | 4/1965 | Moffat | 165—9 |
| 3,251,403 | 5/1966 | Smith | 165—10 |
| 3,294,156 | 12/1966 | Beaufrere et al. | 165—10 |

ROBERT A. O'LEARY, *Primary Examiner.*

T. W. STREULE, *Assistant Examiner.*